(12) United States Patent
D'Herin Bytner

(10) Patent No.: US 12,031,251 B2
(45) Date of Patent: Jul. 9, 2024

(54) INSTALLATION FOR MANUFACTURING MINERAL WOOL AND DEVICE FOR DISCHARGING A GLUING COMPOSITION WITH WHICH SUCH AN INSTALLATION IS EQUIPPED

(71) Applicant: SAINT-GOBAIN ISOVER, Courbevoie (FR)

(72) Inventor: Frédéric D'Herin Bytner, Paris (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 1199 days.

(21) Appl. No.: 16/635,104

(22) PCT Filed: Jul. 26, 2018

(86) PCT No.: PCT/FR2018/051928
§ 371 (c)(1),
(2) Date: Jan. 29, 2020

(87) PCT Pub. No.: WO2019/025707
PCT Pub. Date: Feb. 7, 2019

(65) Prior Publication Data
US 2020/0157718 A1    May 21, 2020

(30) Foreign Application Priority Data
Jul. 31, 2017 (FR) ..................................... 1770812

(51) Int. Cl.
*D04H 1/655* (2012.01)
*B05B 1/20* (2006.01)
(Continued)

(52) U.S. Cl.
CPC ............... *D04H 1/655* (2013.01); *B05B 1/20* (2013.01); *B05B 7/025* (2013.01); *B05B 7/08* (2013.01);
(Continued)

(58) Field of Classification Search
CPC .... D04H 1/655; D04H 1/4218; D04H 1/4226; D04H 5/12; B05B 1/20; B05B 7/025;
(Continued)

(56) References Cited

U.S. PATENT DOCUMENTS

| 3,901,675 A | 8/1975 | Buchanan et al. |
| 8,197,587 B2 | 6/2012 | Jaffrennou et al. |

(Continued)

FOREIGN PATENT DOCUMENTS

| EP | 1 807 259 A2 | 7/2007 | |
| EP | 3097985 B1 * | 11/2018 | ........... B05B 15/652 |

(Continued)

OTHER PUBLICATIONS

International Search Report as issued in International Patent Application No. PCT/FR2018/051928, dated Oct. 2, 2018.

*Primary Examiner* — George R Koch
(74) *Attorney, Agent, or Firm* — Pillsbury Winthrop Shaw Pittman LLP

(57) ABSTRACT

An annular discharge device for discharging a gluing composition onto glass fibres includes at least one distribution circuit for the gluing composition and a plurality of spray nozzles fluidically connected with the distribution circuit and distributed over the perimeter of the annular discharge device for discharging the gluing composition onto the glass fibres intended to pass into the annular discharge device defined by an axis of revolution, each spray nozzle being oriented towards the interior of the annular discharge device with an angle of inclination determined in relation to the plane of revolution of the annular discharge device. At least two spray nozzles arranged consecutively on the perimeter of the annular discharge device are disposed so as to have an orientation with respect to the plane of revolution of the (Continued)

annular discharge device each with a different angle of inclination with respect to one another.

14 Claims, 3 Drawing Sheets

(51) Int. Cl.
| | |
|---|---|
| *B05B 7/02* | (2006.01) |
| *B05B 7/08* | (2006.01) |
| *C03C 25/14* | (2018.01) |
| *D04H 1/4218* | (2012.01) |
| *D04H 1/4226* | (2012.01) |
| *D04H 5/12* | (2012.01) |

(52) U.S. Cl.
CPC ............ *C03C 25/14* (2013.01); *D04H 1/4218* (2013.01); *D04H 1/4226* (2013.01); *D04H 5/12* (2013.01)

(58) Field of Classification Search
CPC ......... B05B 7/08; B05B 15/68; B05B 15/652; C03C 25/14
See application file for complete search history.

(56) References Cited

U.S. PATENT DOCUMENTS

| | | |
|---|---|---|
| 2012/0144868 A1 | 6/2012 | Mirth et al. |
| 2012/0144870 A1* | 6/2012 | Johnson ............... D04H 1/4226 |
| | | 65/442 |
| 2015/0190821 A1* | 7/2015 | Pahl ....................... B05B 15/68 |
| | | 118/300 |

FOREIGN PATENT DOCUMENTS

| | | |
|---|---|---|
| FR | 2 878 864 A1 | 6/2006 |
| WO | WO 2006/044351 A2 | 4/2006 |
| WO | WO 2008/085461 A1 | 7/2008 |
| WO | WO 2010/029266 A1 | 3/2010 |
| WO | OR WO A1 2012/072938 | 6/2012 |
| WO | WO-2012078743 A1 * 6/2012 ................ C02F 1/66 |
| WO | WO 2012/168619 A1 | 12/2012 |
| WO | WO 2012/168621 A1 | 12/2012 |
| WO | WO 2013/014399 A1 | 1/2013 |
| WO | WO 2015/181458 A1 | 12/2015 |

* cited by examiner

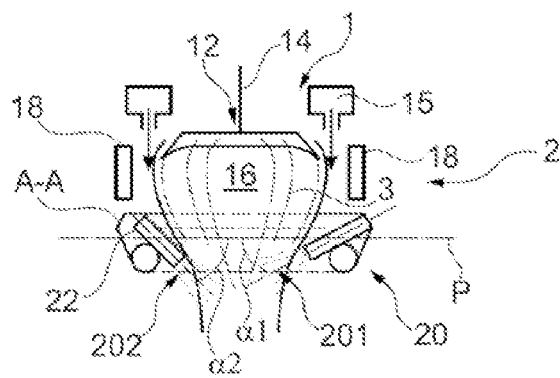
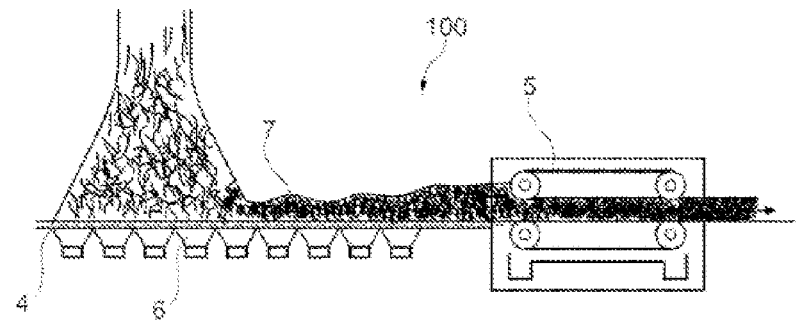
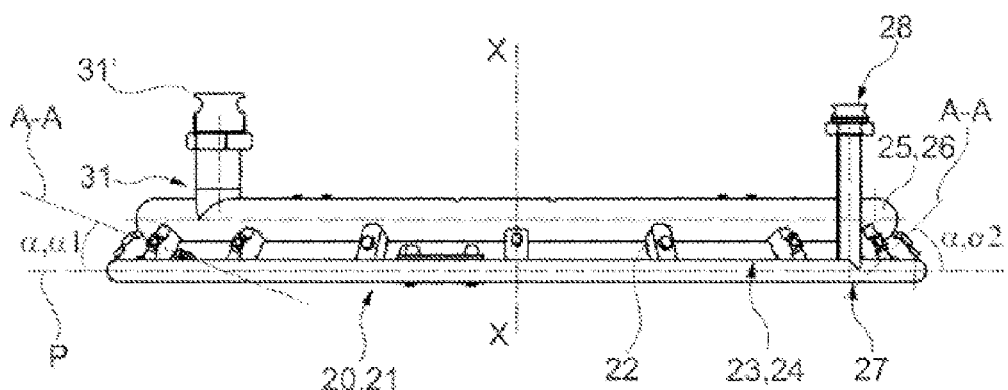
Fig. 1
Fig. 2

INSTALLATION FOR MANUFACTURING MINERAL WOOL AND DEVICE FOR DISCHARGING A GLUING COMPOSITION WITH WHICH SUCH AN INSTALLATION IS EQUIPPED

CROSS-REFERENCE TO RELATED APPLICATIONS

This application is the U.S. National Stage of PCT/FR2018/051928, filed Jul. 26, 2018, which in turn claims priority to French patent application number 1770812 filed Jul. 31, 2017. The content of these applications are incorporated herein by reference in their entireties.

The invention deals with the field of the manufacture of mineral wool, of glass wool type for example, and it relates more particularly to the operations and the corresponding systems for discharging binder between and/or onto the fibres.

Mineral wool manufacturing installations conventionally comprise several successive stations, including a fiberization station, in which the glass fibre is created, a gluing station, in which the fibres are bound together by the addition of a gluing composition, and a crosslinking station in which the batt of fibres glued together obtained previously is transformed by heating to form the mineral wool.

More specifically, molten glass is deposited into a rotary dish which forms, in the fiberization station, a centrifuging device, from the outside of which glass fibres escape to fall towards a conveyor, under the effect of a stream of air. As the fibres pass in falling towards this conveyor, the gluing composition involved in forming the binder is sprayed over the passage of the fibres. In order to avoid the evaporation of the gluing composition, a cooling operation can be applied to the fibres to be glued, through the discharging of a coolant and in particular of water downstream of the gluing operation. The glued fibres, once cooled, fall onto the conveyor and the dually formed batt is then directed towards an oven forming the crosslinking station, in which the batt is simultaneously dried and subjected to a specific heat treatment which provokes the polymerization (or "curing") of the resin of the binder present on the surface of the fibres.

The continuous batt of mineral wool is then intended to be cut to form, for example, panels or rolls of thermal and/or acoustic insulation.

The discharging of binder is controlled at the time of the passage of the fibres to be glued. From the prior art, and in particular from the document EP1807259, a binder discharge device is known that comprises two annular rings bearing spray nozzles and into which the glass fibres successively pass. A ring is linked to a tank of binder and each spray nozzle associated with this first ring is configured to receive, on the one hand, a quantity of this binder and, on the other hand, a quantity of compressed air via an independent feed for discharging the binder upon the passage of the glass fibres, and the other ring is linked to a tank of coolant and each spray nozzle associated with this second ring is configured to discharge this coolant upon the passage of the glass fibres.

Different types of spray nozzles are known, and in particular, among others, cone nozzles, which make it possible to supply a jet that is localised and that can penetrate strongly into the torus of glass fibres passing through the annular ring bearing these spray nozzles, or fan nozzles, which make it possible to supply a jet that is more diffuse and therefore that can be distributed over the outer perimeter of the torus of fibres. In the document WO 2008/085461, it is proposed to arrange different types of spray nozzles on one and the same ring, and in particular by alternating concentrated jet nozzles and fan nozzles, in order to discharge gluing agent both on the inside and on the outside of the torus of glass fibres.

In this context of the layout of the spray nozzles on an annular ring for discharging gluing agent on the passage of glass fibres, it is important to take account of the possibility of one of the nozzles being deficient, and in particular of it being plugged, which can generate, for a short period before this deficient nozzle is replaced, a distribution of the binder which is no longer uniform over all the perimeter of the torus formed by the glass fibres. The addition of spray nozzles that can back up such a deficiency raises the issue of the arrangement of the nozzles on the ring.

The present invention falls within this context and aims to propose an annular device for discharging a gluing composition onto mineral fibres, for example glass fibres, comprising at least one distribution circuit for said gluing composition and a plurality of spray nozzles fluidically connected with the distribution circuit and distributed over the perimeter of the annular discharge device for discharging the gluing composition into the fibres intended to pass into the annular discharge device defined by an axis of revolution, each spray nozzle being oriented towards the interior of the annular discharge device with an angle of inclination determined in relation to the plane of revolution of the annular discharge device. According to the invention, at least two spray nozzles arranged consecutively on the perimeter of the annular discharge device are disposed so as to have an orientation with respect to the plane of revolution of the annular discharge device each with a different angle of inclination with respect to one another.

Such a solution makes it possible to increase the number of nozzles without taking the risk of jets of gluing composition intersecting. The inventors have indeed discovered that it was beneficial to not allow the jets sprayed by these nozzles to intersect, such interference potentially generating a modification of the gauge of the drops formed by coalescence. Thus, it is possible according to the invention to dispose nozzles close to one another, to ensure coverage of the torus of fibres greater than 100% and ensure that the torus of fibres is correctly glued even in the event of failure of a nozzle, while avoiding the risk, if they all operate simultaneously, of the jets sprayed by these nozzles not being in the desired form. A uniformity of the composition distribution of a gluing composition onto a torus of glass fibres is thus targeted, since it is possible to discharge this gluing composition over all the perimeter of the torus and with a controlled form of the drops which do not vary according to the zone of spraying.

According to different features of the invention, taken alone or in combination, it will be possible to predict for:
said at least two spray nozzles arranged consecutively on the perimeter of the annular discharge device to have an identical form, being distinguished from one another only by the inclination of the output channel thereof; it is consequently understood that, according to the invention, successive spray nozzles are distinguished essentially by their different orientation with respect to the plane of revolution of the annular discharge device, the identical or distinct form, both in their outer jacket and in the type of jet produced for example, being a secondary differentiation feature;
the angle of inclination of a spray nozzle with respect to the plane of revolution lies between 0 and 80°; preferably, this angle of inclination lies between 5° and 80°;

a minimum inclination of 5° is advantageous in as much as it avoids a kick-back of the drops of binder on the torus of fibres passing into the annular discharge device, a kick-back which could penalise the subsequent discharging of binder; more particularly, the angle of inclination can lie between 5° and 70°, a maximum inclination of 70° being advantageous in that it avoids spraying the binder along the torus of the fibres towards the conveyor situated under the annular discharge device and in that it allows the penetration of the binder into the torus of fibres, while these fibres run at great speed in front of the annular discharge device; advantageously, the angle of inclination lies between 5° and 60°;

each nozzle comprises a fixing body secured to an annular tube delimiting the at least one distribution circuit, said at least two spray nozzles consecutively arranged on the perimeter of the annular discharge device having bodies disposed at one and the same axial level in relation to the axis of revolution of the annular discharge device;

the at least two spray nozzles arranged consecutively on the perimeter of the annular discharge device comprise a spray head with a slit with rectangular section so as to form a flat jet of gluing composition;

the slit with rectangular section extends mainly in a direction parallel to the plane of revolution of the device;

the slit with rectangular section is dimensioned so that the corresponding flat jet of gluing composition has an angular aperture of between 30° and 120°;

the at least two spray nozzles arranged consecutively on the perimeter of the annular discharge device comprise a spray head with a slit with circular section so as to form a conical jet of gluing composition; it will also be possible to envisage that the at least two spray nozzles are arranged consecutively on the perimeter of the annular discharge device comprising, for one, a spray head with a slit with circular section so as to form a conical jet of gluing composition and, for the other, a spray head with a slit with rectangular section so as to form a flat jet of gluing composition;

the annular discharge device comprises a plurality of spray nozzles and each nozzle is adjacent to nozzles whose orientation with respect to the plane of revolution of the annular discharge device is different from its own;

the nozzles are divided up into at least two sets, between a first set in which each nozzle is configured so that the orientation with respect to the plane of revolution of the annular discharge device takes a first angle of inclination and a second set in which each nozzle is configured so that the orientation with respect to the plane of revolution of the annular discharge device takes a second angle of inclination that is distinct from the first angle, the spray nozzles being arranged on the perimeter of the annular discharge device with an alternation of nozzles of the first set and of nozzles of the second set;

the nozzles of the first set are configured so that they are oriented with respect to the plane of revolution of the annual discharge device with a first angle of inclination lying between 0° and 45°; preferably, the first angle of inclination can be between 5° and 40°;

the nozzles of the second set are configured so that they are oriented with respect to the plane of revolution of the annular discharge device with a second angle of inclination lying between 25° and 80°; preferably, the second angle of inclination can be between 25° and 60°;

the circuit for the gluing composition comprises a single feed and a plurality of orifices connected respectively with a spray nozzle;

the distribution circuit has a continuous mean internal section;

the annular discharge device comprises two distinct distribution circuits that are offset along the axis of revolution of the annular discharge device, the spray nozzles being arranged between these two distribution circuits so as to be fluidically connected with each of said distribution circuits;

a first distribution circuit is configured to receive said gluing composition and a second distribution circuit is configured to receive compressed air;

the first distribution circuit has a mean section of diameter less than the diameter of the mean section of the second distribution circuit;

the annular discharge device comprises a single distribution circuit to which the spray nozzles are fixed, these spray nozzles being arranged with different inclinations on this single distribution circuit so that at least two spray nozzles arranged consecutively on the perimeter of the annular discharge device have a different angle with respect to the plane of revolution of the annular discharge device;

the annular discharge device comprises means for controlling the flow rate of compressed air as a function of the quantity of gluing composition to be discharged onto the fibres.

The invention relates also to a mineral wool manufacturing installation, comprising fiberization means configured to bring fibres into a gluing station and notably gluing of these fibres, characterized in that the gluing station comprises only a gluing device formed by an annular discharge device for discharging gluing composition according to what has just been described, the annular device being arranged so as to have a plane of revolution that is substantially at right angles to the direction of passage of the torus of fibres to be glued.

It should be noted that an installation of this type is particularly advantageous in that there has been eliminated, in the gluing station, that is to say the station downstream of the fiberization means with respect to the path of the fibres, a cooling stage. The inventors were able to note that the fibres passing into such a gluing station with one cooling stage less, are, at the output of the gluing station, that is to say towards a crosslinking station, in perfect condition for this crosslinking operation.

In such an installation, the annular discharge device can be arranged so that the first distribution circuit, associated with the gluing composition, is disposed downstream of the path of the fibres with respect to the second distribution circuit, associated with the compressed air.

The invention relates also to a mineral wool manufacturing method during which at least the following steps are carried out:

molten glass is brought into a fiberization station, glass fibres are created in this fiberization station, in such a way that these glass fibres take the form of a bundle of fibres directed towards a gluing station, in the gluing station, the fibres of the bundle are bound together by the addition of a gluing composition, the fibres of the bundle being bound directly upon their entry into the gluing station without a cooling ring being arranged in the gluing station, and the batt of fibres glued together obtained previously is transformed by heating to form the mineral wool.

More particularly, the mineral wool manufacturing method can comprise a step of creation of the glass fibres by a centrifuging effect applied to molten glass, the filaments of glass formed by centrifuging being drawn to form a torus of fibres under the effect of a discharging of a gaseous current at high speed and at sufficiently high temperature.

It can be noted that, in the manufacturing method according to the invention, the gluing composition is discharged onto the bundle of fibres by the discharging of a gluing composition, without the latter being associated with a specific cooling step upstream or downstream of the discharging of binder in the gluing station. It should be noted that, in the mineral wool manufacturing method according to the invention, on the one hand the bundle of fibres formed by the blowing of the gaseous current at high temperature receives a discharge of gluing composition without it being necessary to form a specific preliminary cooling stage, and on the other hand, the bundle of glued fibres reaches the crosslinking station without it being necessary to form a specific cooling stage between the gluing station and the crosslinking station.

Other features, details and advantages of the present invention will emerge more clearly on reading the detailed description given hereinbelow by way of indication, in relation to the different exemplary embodiments of the invention illustrated in the following figures:

FIG. 1 is a schematic representation of a part of a mineral wool manufacturing installation, illustrating in particular the gluing station in which a gluing composition is sprayed onto a torus of fibres;

FIG. 2 is a front view of the gluing device represented schematically in FIG. 1, engaged around a hood of a fiberization station in which the fibres to be glued are obtained;

Figure 7:
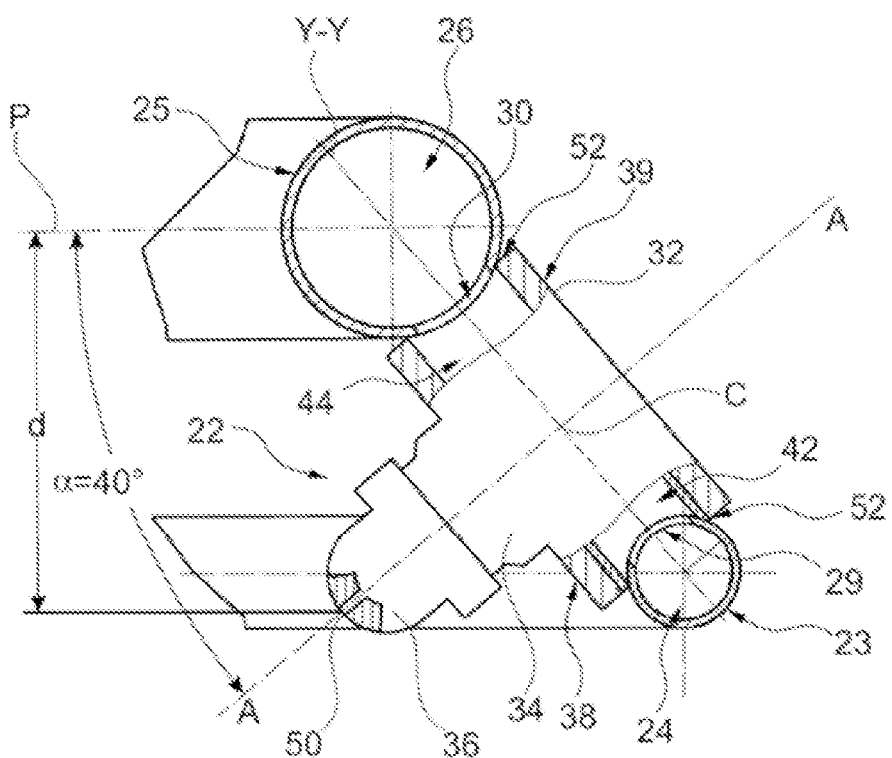

and FIG. 7 is a partial cross-sectional view of an exemplary embodiment of spray nozzle and of the distribution circuits onto which it is added.

The invention relates to a particular arrangement of nozzles for spraying binder onto a torus of glass fibres, and specific notably in that, in a plurality of nozzles arranged in series around the passage of this torus of fibres, two adjacent nozzles of this series are configured to discharge binder onto the torus of fibres, each with a spraying angle different from the other. As will be described hereinbelow, this makes it possible to have an arrangement in which the nozzles are close to one another, to improve the overlap between the vaporization zones, without that in any way generating problems of coalescence of the drops.

FIG. 1 shows a part of a mineral wool manufacturing installation 100, and more particularly a glass wool manufacturing installation, and more particularly different successive stations participating in the creation of an insulating batt composed of glued glass fibres forming an insulating material of mineral wool type, for example glass wool. A first station, called fiberization station 1, consists in obtaining fibres via a centrifuging dish, downstream of which there is a second station, called gluing station 2, in which the gluing of the fibres 3 previously obtained is primarily done to bind them together.

The glued fibres are placed in a forming station on a conveyor belt 4, which takes them along to an oven forming a crosslinking station 5 and in which they are heated to crosslink the binder.

The conveyor belt 4 is permeable to gases and to water, and it extends above suction plenums 6 for the gases such as air, fumes and the excess aqueous compositions from the fiberization process previously described. There is thus formed, on the conveyor belt 4, a batt 7 of glass wool fibres mixed intimately with the gluing composition. The batt 7 is conducted by the conveyor belt 4 to the oven forming the crosslinking station 5 for the binder, which can here, by way of example, be a thermosetting binder.

It is understood that such an installation line is suited to the production of products based on glass wool fibres, as will be described, but it is obviously suited to the production of products based on mineral fibres.

The fiberization station 1 is configured here for the implementation of a fiberization method based on internal centrifuging. It will be understood that any type of centrifuging and of associated centrifuge can be implemented with the teachings hereinbelow given that fibres are obtained at the output of the centrifuge for their future passage into the gluing station.

As an example illustrated in FIG. 1, the molten glass can be brought as a thread 14 from a melting oven and first of all recovered in a centrifuge 12, to then escape in the form of a multitude of rotationally-driven filaments. The centrifuge 12 is moreover surrounded by an annular burner 15 which creates, at the peripheral of the wall of the centrifuge, a gaseous current at high speed and at a temperature that is sufficiently high to draw the glass fibre filaments into the form of a torus 16.

It is understood that the example of fiberization station given above is indicative of and nonlimiting on the invention, and that it will equally be possible to provide a method of fiberization by internal centrifuging with a basket and a perforated bottom wall, or with a dish with a solid bottom, given that the molten glass is drawn by centrifuging to then extend in the form of a torus of fibres 16 into the gluing station.

Moreover, it will be possible to provide other variants nonlimiting on the invention for this fiberization station, and in particular means as an alternative to or cumulative with the annular burner, and for example heating means 18, for example of inductor type, serving to keep the glass and the centrifuge at the right temperature.

The duly created torus of fibres 16 is surrounded by an annular device for projecting a gluing composition, hereinafter called gluing device 20, of which only two spray nozzles 22 are represented in FIG. 1.

There now follows a more detailed description of the discharge device, or gluing device 20, arranged in the gluing station 2, notably with reference to FIGS. 2 to 7.

The gluing device 20 comprises an annular ring 21, having a general form of revolution about an axis of revolution X-X. The ring 21 comprises two distinct distribution circuits that are offset by a distance d along the axis of revolution X-X and a plurality of spray nozzles 22 arranged between these two distribution circuits and configured to ensure a fluidic connection with the distribution circuits. Variants relating to the number of distribution circuits of the ring and/or to the circulation of fluid in these distribution circuits will be described hereinbelow.

In the example illustrated, the annular ring comprises in particular a first annular tube 23 within which a first distribution duct 24 (visible in FIGS. 5 to 7 in particular) is formed to allow a circulation of a gluing composition, as well as a second annular tube 25, which extends according to a plane of revolution, at right angles to the axis of revolution X-X of the annular ring 21, and parallel to the plane of revolution of the first annular tube 23. Hereinbelow, a plane of revolution P of the annular discharge device is defined as being one or other of the planes of revolution as have just been described, or at the very least a plane parallel thereto.

Inside this second annular tube 25, a second distribution duct 26 (also visible in FIGS. 5 to 7) is formed to allow a circulation of compressed air, capable of discharging the gluing composition onto the fibres passing through the gluing device 20.

The first annular tube 23 has a tubular form, of which the internal wall delimiting the first distribution duct 24, has a section that is constant, or substantially constant, over all the perimeter of the tube. Substantially constant section is understood to mean a section which remains the same with a margin of difference less than 5%. As an indicative example, the mean section of the first annular tube can have a diameter D1 of between 10 mm and 30 mm.

The first annular tube 23 comprises a single feed zone 27, in which there is added a feed pipe 28 for a gluing composition, linked at its other end to a tank of this gluing composition, here not represented, and in which water and glue are mixed.

The feed pipe 28 for a gluing composition is arranged parallel to the axis of revolution of the annular distribution ring, but it is understood that this gluing composition feed could be arranged differently without departing from the context of the invention. It should however be noted that, according to a feature of the invention, the gluing composition is injected into the first distribution duct of the first annular tube via a single feed zone, the gluing composition moreover being intended to circulate over all the perimeter of the first distribution duct.

The first annular tube 23 delimiting the first distribution duct 24 also comprises a plurality of outlet orifices 29, (visible in FIGS. 5 to 7 in particular), regularly distributed over all the perimeter of the first annular tube. As will be described in more detail hereinbelow, each of these outlet orifices emerges on a spray nozzle 22 arranged to be fluidically connected with the first distribution duct 24 via the corresponding outlet orifice.

The result of the above is that the first annular tube 23 is devoted to the distribution of a gluing composition toward the spray nozzles 22.

Moreover, the second annular tube 25 has a tubular form, of which the inner wall, delimiting the second distribution duct 26, has a section that is constant, or substantially constant, over all the perimeter of the tube. Substantially constant section is understood to mean a section which remains the same with a margin of difference less than 5%. As an indicative example, the mean section of the second annular tube can have a diameter D2 of between 30 mm and 50 mm.

Like the first annular tube, the second annular tube 25 comprises a single feed zone 31 in which there is added a feed coupling 31' for an intake of compressed air.

The compressed air feed coupling 31' is arranged parallel to the axis of revolution of the annular distribution ring and parallel to the feed pipe 28 for a gluing composition, but it is understood that this compressed air feed could be arranged differently without departing from the context of the invention. It should however be noted that, according to a feature of the invention, the compressed air is injected into the second distribution duct of the second annular tube via a single feed zone the compressed air moreover being intended to circulate over all the perimeter of the second distribution duct.

The second annular tube 25 delimiting the second distribution duct 26 also comprises a plurality of outlet orifices 30 (visible in FIGS. 5 to 7), regularly distributed over all the perimeter of the second annular tube. Like what has been able to be described for the first annular tube 23, each of these outlet orifices emerges on a spray nozzle 22 arranged to be fluidically connected with the second distribution duct 26 via the corresponding outlet orifice, each of the spray nozzles 22 of the gluing device 20 being fluidically connected on the one hand with the first distribution duct 24 and on the other hand with the second distribution duct 26.

The result of the above is that the second annular tube 26 is devoted to the distribution of compressed air toward the spray nozzles 22.

Figure 3:
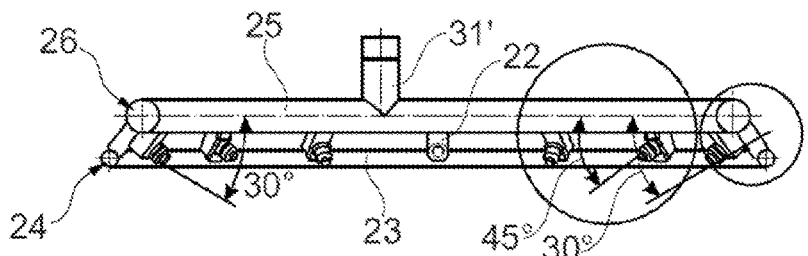
FIG. 3 is a front view of a half of the gluing device of FIG. 2.

As can be seen in FIGS. 2 and 3 in particular, this second annular tube 25, delimiting the second distribution duct 26 dedicated to the circulation of compressed air, is disposed above the first annular tube 23, delimiting the first distribution duct 24 dedicated to the circulation of the gluing composition. For the term above to be correctly understood, reference is made to the position of the gluing device in the installation. The second annular tube 25 disposed above the first annular tube 23 is disposed as close as possible to the centrifuging dish from which the fibres drop, such that these fibres forming the torus 16 are required to pass first of all through the annular tube delimiting the duct dedicated to the compressed air.

The diameter of the loop that the first tube forms around the axis of revolution of the annular ring is greater than the corresponding diameter of the second tube, such that these two annular tubes are arranged one above the other with a radial offset r so that the second annular tube is innermost with respect to the first annular tube. The result thereof is an inclined orientation, relative to the axis of revolution of the annular ring, of the spray nozzles 22 which are secured to each of the two annular tubes. As will be described hereinbelow, the spray nozzles are fixed onto the annular tubes so that their angle of inclination with respect to the axis of revolution can vary from one nozzle to another.

The first and second annular tubes are configured so that their internal wall respectively delimiting the first and second distribution ducts each has a mean section that differs from one another. In particular, the inner wall of the second tube defines a mean section of diameter D2 greater than the diameter D1 of the mean section of the inner wall of the second annular tube. The section of passage for the gluing composition is thus smaller than the section of passage for the compressed air. Such a feature makes it possible to ensure the fact that the first, narrower distribution duct, is constantly filled with the gluing composition and that there is no failure of feed to the spray nozzles. Moreover, the smaller dimensioning of the first distribution duct makes it possible to accelerate the speed of displacement of the gluing composition in this first duct and therefore prevent any clogging of the first annular tube.

This difference in internal diameter of the annular tubes also results in a difference in outer diameter of these tubes such that a larger tube is provided for the intake of air than for the intake of the gluing composition. In the example illustrated, the larger tube is located above the smaller, and fixing flanges, here not represented, for fixing the ring in the gluing station, can be added in particular on the larger tube. It is understood that the tubes could be arranged differently relative to one another without that in any way departing from the context of the invention, with, in particular, the air intake tube which could be situated below the smaller tube provided for the gluing composition.

As illustrated in FIGS. 2 to 7 in particular, the annular tubes 23, 25 forming the annular duct 21 are arranged one above the other such that the first outlet orifices of the first distribution duct and the second outlet orifices of the second distribution duct axially superpose, that is to say that they are distributed angularly in the same way about the corresponding axis of revolution of the duct.

In this way, the spray nozzle 22 which fluidically connects a first outlet orifice of the first distribution duct with a second outlet orifice of the second distribution duct, extends axially, that is to say in a plane comprising the axis of revolution X-X of the annular ring.

Figure 5:
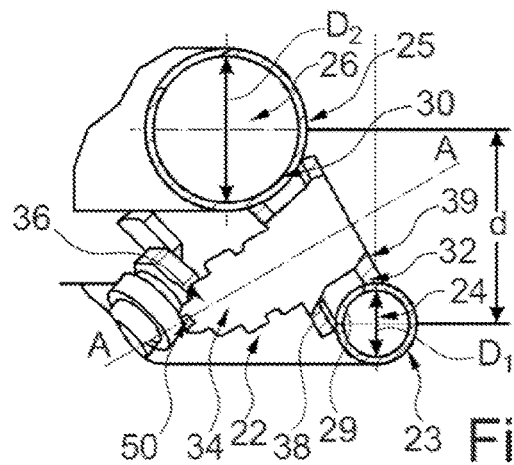
FIGS. 5 and 6 are cross-sectional views of a spray nozzle according to the cutting planes V-V and VI-VI represented in FIG. 4.
Figure 6:
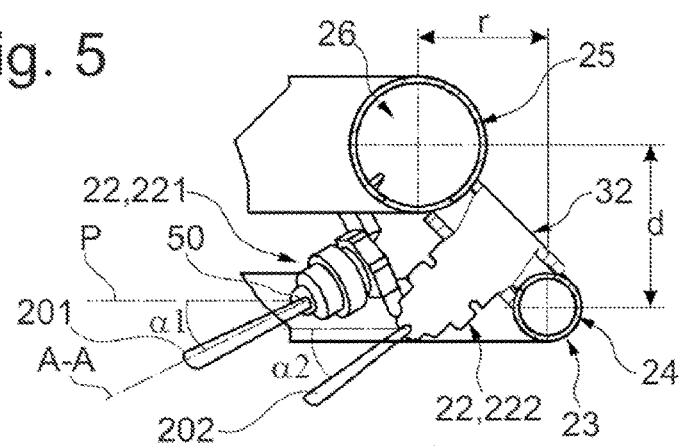

As illustrated in particular in FIGS. 5 to 7, the spray nozzle 22 comprises a body 32 which extends between the two annular tubes, a liquid nozzle 34 which extends through this body 32 according to an axis of orientation A-A and at the free end of which is disposed a spray head, or air cap, 36, configured to allow the vaporization of the gluing composition according to a jet of specific form, here flat.

The body 32 has a cylindrical form, here of rectangular section, comprising two internal channels so that the body can receive, on the one hand, the gluing composition coming from the first distribution duct 24 via a first outlet orifice 29, and, on the other hand, the compressed air coming from the second distribution duct 26 via a second outlet orifice 30. The body 32 is thus defined by an axis of extension Y-Y which extends from one annular tube to the other. In the configuration illustrated in FIG. 7, the spray nozzle 22 is configured so that the axis of extension Y-Y coincides with a straight line passing through the centre of each of the annular tubes and the result thereof is an angle α between the axis of orientation A-A of the liquid nozzle 34 and the plane of revolution P of the annular discharge device that is equal here to 40°.

The body 32 of each spray nozzle 22 is welded onto the annular tubes, once its ends are placed facing the outlet orifices formed in each of the tubes.

A first face 38 of the body 32 is oriented toward the interior of the annular ring and its axis of revolution X-X and a second face 39 is oriented in the opposite direction. The body comprises, at its centre, transversely to the axis of extension Y-Y of the body, a sheath for receiving the liquid nozzle 34 emerging at each end on one of the first and second faces of the body 32. The sheath extends substantially at the centre of the body, that is to say equidistant from the first annular tube 23 and from the second annular tube 25. The sheath is pierced so as to connect with a first internal channel 42, connected with the first outlet orifice 29 and extending parallel to the axis of extension Y-Y of the body 32. These internal channels are configured to separately bring the compressed air and the gluing composition close to the spray head 36.

The spray head 36 has a domed form defining a mixing chamber at the output of the liquid nozzle 34, in which the compressed air and the gluing composition are mixed to form the drops that are forced to be discharged via a spray slit 50 formed in the spray head.

It is understood that the spray nozzle 22 is configured to allow a fluidic connection between the first distribution duct 24 of the annular tube 23 and/or the second distribution duct 26 of the annular tube 25, and that the spray slit 50, through which the binder based on biosourced products exits from the annular discharge device, is configured to discharge a gluing spray onto the torus of fibres and to disperse the spray over an angular range.

The spray slit 50 is centred on the axis of orientation A-A of the spray nozzle, that is to say on the axis of the hollow rod 46 defining the circulation duct for the gluing composition inside the body of the vaporiser, and it is understood that the axis of orientation A-A of the spray nozzle defines the main direction of discharge according to which the gluing composition will be discharged at the output of the spray nozzle.

As can be seen in FIG. 5 in particular, the spray slit has a rectangular section forming a fan nozzle, such that, in the main direction of discharge, the gluing composition is discharged according to an aperture angle determined by the length of the rectangular section. The aperture angle of the fan thus formed is between 30 and 120°.

The spray head 36 is oriented so that the length of the rectangular slit 50 is at right angles to the plane passing through the axis of revolution X-X of the annular ring and through the axis of orientation A-A of the spray nozzle, and parallel to the plane of revolution of the annular discharge device and therefore of each annular tube of this device.

The operation of the gluing device with at least one spray nozzle as has just been described is as follows. Appropriate control means make it possible to control the intake of the gluing composition into the first distribution duct via the feed pipe 28. The gluing composition is pushed to circulate over all the perimeter of the annular tube delimiting this first distribution duct, and to circulate to each of the first orifices 29 connected with the spray nozzle 22. The gluing composition entering into the spray nozzle 22 passes into the liquid nozzle 34 via the sleeve 40 and is pushed towards the spray head 36 and the mixing chamber.

Simultaneously, appropriate control means make it possible to control the intake of compressed air, at a desired flow rate and pressure, into the second distribution duct via the feed coupling 31'. The flow rate and the pressure of the air are determined in particular as a function of the dosage of gluing composition. The compressed air is pushed to circulate over all the perimeter of the annular tube delimiting this second distribution duct, and to circulate to each of the second orifices connected with the spray nozzle 22. The compressed air entering into the spray nozzle 22 is pushed in the circulation ducts 48 at the periphery of the liquid nozzle 34 toward the spray head 36 and the mixing chamber, in which the mix of the compressed air and of the gluing composition participates in the vaporization of the binder, the control of the air flow rate as a function of the quantity of binder discharged making it possible in particular to act on the size of the drops.

It is understood that the operation of the gluing device as has just been described, and the benefit of the specific orientation of at least two nozzles with respect to the plane of revolution of the device, will be the same regardless of the fan or cone type of gluing composition jet. The spray slit with which each nozzle is equipped will thus be able to have a rectangular section, participating in forming a fan nozzle, as has been illustrated, or else a circular section, participating in forming a cone nozzle.

There now follows a more detailed description of the specific arrangement of the spray nozzles according to the invention, and in particular the variable inclination of at least two of these nozzles on the perimeter of the annular ring.

As is illustrated in FIGS. 2 to 6 in particular, the gluing device according to the invention comprises a plurality of spray nozzles, arranged on the perimeter of the annular ring. These nozzles are annularly distributed regularly over all the perimeter of the ring. It is understood that, according to the embodiments of the invention, the number of nozzles, and therefore the angular separation between two adjacent nozzles, can vary from one gluing device to another. In FIG. 2, the gluing device comprises a series of sixteen spray nozzles, such that the annular separation between two successive nozzles of the series is 22.5°.

These nozzles are arranged on one and the same axial level, that is to say each arranged between the first annular tube and the second annular tube, such that the body of each nozzle is centred on one and the same plane at right angles to the axis of revolution of the annular ring. In other words, it can be stated that the spray nozzles are configured so that their bodies, that is to say their junction with each of the annular tubes, extend to the same height.

In the figures, and in particular in FIGS. 2 to 6, an exemplary embodiment has been illustrated in which all the spray nozzles are of identical design, such that the nozzles differ only by the inclination of their axis of orientation A-A. It will be understood that, without departing from the context of the invention, the spray nozzles could differ in their design, given that at least two spray nozzles extending to the same height each have inclinations different from one another.

Figure 4:
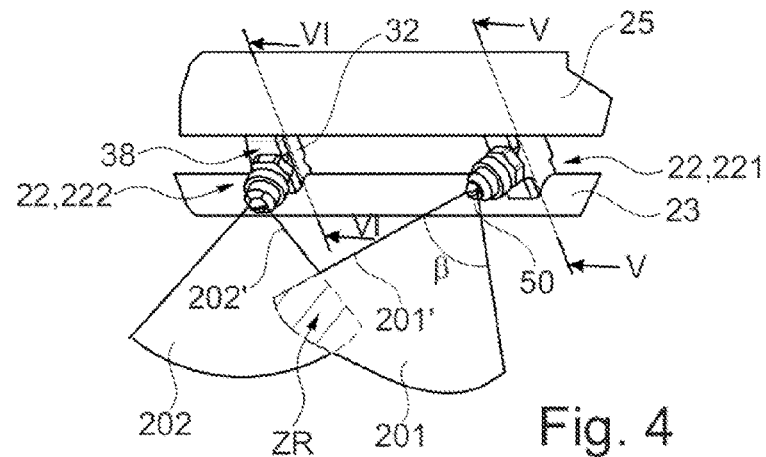
FIG. 4 is a detail view of FIG. 3, illustrating more particularly two spray nozzles of the gluing device in order to show their different orientation, a jet of binder as sprayed by these nozzles being represented schematically.

According to the invention, at least two spray nozzles consecutively arranged on the perimeter of the ring, that is to say two adjacent spray nozzles as illustrated in FIG. 4, are disposed so that the axis of orientation A-A, and therefore its outlet channel, of one of these two nozzles has an angle with respect to the plane of revolution of the ring different from that of the other two nozzles.

In the example illustrated, at least two sets of spray nozzles are distinguished by their inclination with respect to the plane of revolution of the ring. The spray nozzles of a first set 221, like that visible in FIG. 6, are inclined so that the axis of orientation A-A forms, with the plane of revolution of the annular ring, a first angle α1, here equal to 30°. And the spray nozzles of a second set 222, such as that visible in FIG. 6, are inclined so that the axis of orientation A-A forms, with the plane of revolution of the annular ring, a second angle α2, here equal to 45°.

It is understood, by virtue of the feature of the invention according to which two adjacent nozzles have different inclinations, that the nozzles of each of these two sets are alternated over all the perimeter of the annular ring, such that a nozzle of a given first set 221 of spray nozzles is not adjacent to a nozzle forming part of the same set, that is to say not adjacent to a nozzle having the same inclination with respect to the plane of revolution of the annular ring. On the perimeter, there is an alternation of a spray nozzle 22 of a first set 221 of nozzles, a spray nozzle 22 of a second set 222 of nozzles, then once again a spray nozzle 22 of a first set 221 of nozzles, etc.

FIGS. 5 to 7 illustrate an example according to the invention for producing the different inclinations from one spray nozzle to another.

In each of the two cases illustrated, the centre C of the sleeve formed in the body, and the centre of each of the annular tubes are aligned. Also, the body is pivoted about this central point defined by the centre C of the sleeve to come to bear against the corresponding annular tube in a zone of contact 52 more or less distant from the vertical axis, that is to say the axis parallel to the axis of revolution of the annular ring and passing through the centre of this tube. The result thereof is that the centre C of the sheath of each body is substantially in the same position with respect to the annular tubes from one case to the other, without axial offset relative to the axis of revolution X-X. In other words, the bodies of the spray nozzles having different inclinations are disposed at one and the same axial level relative to the axis of revolution of the annular discharge device.

In a first radial cutting plane illustrated in FIG. 5 and corresponding to the cutting plane V-V of FIG. 4, a spray nozzle of a first set 221 of nozzles has been illustrated. The first outlet orifice of the first tube and the second outlet orifice are separated from the vertical axis specific to each annular tube and the result thereof is a first inclination of the body of the nozzle so that its ends come to overlap the two outlet orifices. This first inclination is equal to the inclination of angle α1 of the axis or orientation A-A of the spray nozzle of a first set 221 with respect to the plane of revolution, that is to say, here, equal to 30°.

In a second radial cutting plane illustrated in FIG. 6 and corresponding to the cutting plane VI-VI of FIG. 4, a spray nozzle of a second set 222 of nozzles has been illustrated. The first outlet orifice of the first tube and the second outlet orifice are closer to the vertical axis specific to each annular tube than they are in the first cutting plane, and the result thereof is a second inclination of the body of the nozzle so that its ends come to overlap the outlet orifices. This second inclination is equal to the inclination of angle α2 of the axis of orientation A-A of the spray nozzle of the second set 222 with respect to the plane of revolution, that is to say, here, equal to 45°.

It should be noted that a spray nozzle of a first set and a spray nozzle of a second set, and in particular two nozzles concentrically arranged on the perimeter of the annular discharge device, have an identical form, as can be illustrated in the figures, and that these nozzles are distinguished from one another only by the inclination of the body linking the two distribution ducts and therefore by the inclination of their outlet channel.

As is illustrated in FIG. 1, this difference in orientation of the nozzles of the first set 221 and of the nozzles of the second set 222 results in a difference in height of discharge of the jets of binder onto the torus of fibres 16. The binder discharged by the nozzles of the first set 221 thus impact the fibres earlier than the binder discharged by the nozzles of the second set 222. This way, the first spray 201 discharged by the nozzle of the first set 221 extends over a plane that is offset axially with respect to the plane in which extends the second spray 202 discharged by a nozzle of the second set 222 and the drops formed in a spray do not meet, or at the very least do so within acceptable limits, drops formed in an adjacent spray, so as to eliminate or limit a problem of coalescence of drops that could be generated by the meeting of the sprays. FIG. 4 shows, by way of example, a zone of axial overlap ZR, in which drops formed at an orthoradial end 201' of the first spray 201 pass over drops formed at an orthoradial end 202' of the second spray 202. In this zone of overlap, the axial offset along the axis of revolution X-X ensures that the drops do not meet and do not risk being deformed. It is thus possible to arrange two adjacent spray nozzles as close as possible together in as much as they form sets of nozzles that are distinct, and therefore at distinct orientations, so as to form these zones of overlap without risk of modification of the drops and so as to be able to ensure a necessary function of redundancy for a gluing of all the perimeter of the torus of fibres should one of the spray nozzles malfunction. It can easily be understood, notably by referring to the illustration of FIG. 4, that, should a spray nozzle of a first set 221 stop operating, gluing agent could continue to be discharged in the zone ZR by a neighbouring nozzle of a second set 222, at a different height to that at which said zone ZR could be glued by the nozzle of the first set 221. This difference in discharge height generated by the differences of inclination of the adjacent nozzles which makes it possible to avoid having the size of the drops delivered by these two adjacent nozzles being modified if they are both in working order.

It will be understood from the above that it is important according to the invention for the spray nozzles arranged on one and the same axial level to have inclinations that are different from one another with respect to the plane of revolution of the annular distribution device, notably, in a preferred situation, by having an alternation in its inclinations, such that, on the perimeter of the annular distribution device, the sprays are alternately directed on so-called high position and onto a so-called low position, the so-called high position being situated upstream of the so-called low position on the path of the fibres passing in the annular distribution device. The discharge offset along the path of the fibres makes it possible to avoid the destruction of one spray by the adjacent spray, and the obtaining of this discharge offset through the spray nozzles, of which the body for fixing to the distribution duct or ducts is situated at the same axial level, makes it possible to render the annular distribution device compact.

An arrangement according to the invention can be implemented in the device described and illustrated previously, and can also be implemented, without departing from the context of the invention, in other embodiments of devices. As an example, it will be possible to provide for the device to comprise spray nozzles arranged directly on an annular tube inside which the glue circulates, the air being added independently before each nozzle, without it being necessary to provide an air distribution duct common to each nozzle and therefore spray nozzles arranged between two ducts as they have been described previously. Consequently, such a device is in accordance with the invention in that it comprises a distribution circuit for the gluing composition and a plurality of spray nozzles fluidically connected with the distribution circuit and distributed over the perimeter of the annular discharge device to discharge the gluing composition onto the glass fibres intended to pass inside the annular discharge device defined by an axis of revolution, each spray nozzle comprising an outlet channel for the delivery of the gluing composition which is oriented toward the interior of the annular discharge device with an angle of inclination determined in relation to the plane of revolution of the device, and in that it also comprises at least two spray nozzles arranged consecutively on the perimeter of the annular discharge device disposed such that their respective outlet channel has a different angle with respect to the plane of revolution of the annular discharge device.

According to another example, it will be possible to provide for the spray nozzles to be so-called "air-less" nozzles, that is to say nozzles operating without the addition of compressed air to produce the discharge of gluing agent. In this case, a first variant can be provided in which the structure of the annular discharge device with the two annular tubes arranged one above the other according to the axis of revolution and the spray nozzles disposed respectively between these two annular tubes is retained, and in which the second annular tube has only a structural function, without serving as distribution circuit. Only a gluing composition circulates in the first distribution circuit formed by the first annular tube, and no air is sent in the second annular tube. It is also possible to provide a second variant in which the annular discharge device comprises only one annular tube on which the spray nozzles are disposed, it being understood that, according to the invention, the spray nozzles are fixed onto this single annular tube in such a way that two adjacent nozzles have different orientations with respect to the plane of revolution of the annular discharge device.

According to another example, it will be possible to provide for the nozzles to be divided up into more than two sets, each set being, as previously, characterized by nozzles having a specific angle of inclination. It will be possible to provide a first set defined by nozzles having an inclination a equal to 15°, a second set defined by nozzles having an inclination a equal to 30°, and a third set defined by nozzles having an inclination a equal to 45°. As previously, having nozzles side-by-side that have the same inclination and whose jet risks being disrupted by the adjacent jet, is thus avoided.

In the above, mention is made of a gluing composition, and the latter can, for example, consist of a phenolic binder or of an alternative binder with low formaldehyde content, preferably even without formaldehyde, such binders often being qualified as "green binders", particularly when they are at least partially derived from a renewable raw material base, in particular vegetal, notably of the type based on sugars, hydrogenated or not.

In more detail, provision can be made to distribute, via the first distribution duct, for a gluing composition containing.
   (a) at least one glucide chosen from among the reducing sugars, the non-reducing sugars, the hydrogenated sugars and a mix thereof, and
   (b) at least one glucide crosslinking agent.

"Glucide crosslinking agent" is understood here to mean a compound capable of reacting, possibly in the presence of a catalyst, with the glucides and of forming therewith an at least partially insoluble three-dimensional network.

Also, the term "glucides" here has a meaning wider than usual, because it encompasses not only the glucides in the strict sense, that is to say the reducing sugars or carbon hydrates of formula $C_n(H_2O)_p$ having at least one aldehyde or ketone group (reducing group), but also the hydrogenation products for these carbon hydrates in which aldehyde or ketone group has been alcohol-reduced. This term also encompasses the non-reducing sugars composed of several glucide patterns in which the carbons carrying semi-acetal hydroxyl are involved in the osidic links binding the patterns to one another.

A gluing composition based on glucides and crosslinking agent, preferably carboxylic polyacids, which can be used in the present invention, is known and described for example in U.S. Pat. No. 8,197,587, WO2010/029266, WO02013/014399, WO2015/181458, WO2012/168619, WO2012/168621, WO02012/072938.

The glucide component can be based on reducing or non-reducing sugars, on hydrogenated sugars free of reducing or non-reducing sugars, or the mixtures thereof.

The reducing sugars include simple sugars (monosaccharides) and glucosides (disaccharides, oligosaccharides and polysaccharides). The examples of monosaccharides that can be cited are those comprising 3 to 8 carbon atoms, preferably the aldoses and advantageously the aldoses containing 5 to 7 carbon atoms. The aldoses that are particularly preferred are the natural aldoses (belonging to series D), notably the hexoses such as glucose, mannose and galactose. Lactose or maltose are examples of disaccharides that can be used as reducing sugar. The polysaccharides that can be used for the present invention preferably have a molar mass by weight less than 100 000, preferably less than 50 000, advantageously less than 10 000. Preferably, the polysaccharide includes at least one pattern chosen from among the abovementioned aldoses, advantageously glucose. Particularly preferred are the reducing polysaccharides which are composed mostly (more than 50% by weight) of glucose patterns.

The reducing sugar can notably be a mixture of monosaccharides, of oligosaccharides and of polysaccharides, notably a dextrin. The dextrins are compounds that conform to the general formula $(C_6H_{10}O_5)_n$. They are obtained by the partial hydrolysis of starch. Their dextrose equivalent (DE) is advantageously between 5 and 99, preferably between 10 and 80.

The non-reducing sugar is preferably a non-reducing oligoholoside enclosing at most ten glucide patterns. Examples of such non-reducing sugars that can be cited are the diholosides such as trehalose, the isotetrahaloses, saccharose and the isosaccharose ("isosucroses"), the triholosides such as melezitose, gentianose, raffinose, erlose and umbelliferose, the tetraholosides such as stachyose, and the pentaholosides such as verbascose. Saccharose and trehalose will be preferred, and even better, saccharose.

"Hydrogenated sugar" is understood in the present invention to mean the set of products resulting from the reduction of a saccharide chosen from among the monosaccharides, disaccharides, oligosaccharides and polysaccharides and from mixers of these products. The hydrogenated sugar is preferably a product of hydrogenation of a hydrolysate of starch (degree of hydrolysis is generally characterized by the dextrose equivalent (DE), lying between 5 and 99, and advantageously between 10 and 80). The hydrogenation transforms the sugar or the mix of sugars (hydrolysate of starch) into polyols or alcohols of sugar.

Examples of hydrogenated sugars that can be cited include erythritol, arabitol, xylitol, sorbitol, mannitol, iditol, maltitol, isomaltitol, lactitol, cellobitol, palatinitol, maltotritol and the products of hydrogenation of starch hydrolysates. Preferably, the hydrogenated sugar or the mix of hydrogenated sugars is composed mostly, that is to say more than 50% by weight, of maltitol (product of hydrogenation of maltose, dimer of glucose resulting from the enzymatic hydrolysis of starch).

The component (a), namely the glucide composed of hydrogenated sugars and/or of reducing and/or non-reducing sugars, advantageously represents from 30 to 70% by weight, preferably from 40 to 60% by weight, dry materials of the gluing composition. These values are understood to be before the addition of any additives.

The crosslinking agent, that is to say the component (b), used in the present invention is preferably chosen from among the polycarboxylic acids, the salts and anhydrides of polycarboxylic acids, the amines, the metal salts of mineral acids, and the salts of amines and of ammonium of mineral acids, as well as the mixtures of the abovementioned compounds.

The mineral acids are, for example, sulfuric acid, phosphoric acid, nitric acid and hydrochloric acid. The metal salts can be salts of alkaline, alkaline earth and transition metals.

The mineral acids and their salts that can be used as crosslinking agent in the present invention are described for example in the applications WO2012/168619, WO02012/168621 and WO02012/072938.

In a preferred embodiment, the crosslinking agent comprises a polycarboxylic acid or is a polycarboxylic acid. The polycarboxylic acid can be a polymer acid (that is to say one obtained by polymerization or carboxylated monomers) or a monomer acid.

To limit the viscosity of the gluing composition, this polycarboxylic acid advantageously has a mean molar mass with a number less than or equal to 50 000, preferably less than or equal to 10 000 and advantageously less than or equal to 5000.

Examples of polymer polycarboxylic acids that can be cited include the homopolymers and copolymers obtained from monomers carrying at least one carboxylic acid group such as "meth" acrylic acid, crotonic acid, isocrotonic acid, maleic acid, cinnamic acid, 2-methylmaleic acid, fumaric acid, itaconic acid, 2-methylitaconic acid, a,b-methyleneglutaric acid and the monomers of unsaturated dicarboxylic acid, such as the maleates and the fumarates of alkyl in $C_1$-$C_{10}$. The copolymers can also contain one or more vinylic or acrylic monomers such as vinyl acetate, styrene substituted or not by alkyl, hydroxyl or sulfonyl groupings, or by a halogen atom, (meth)acrylonitrile, (meth)acrylamide, the alkyl (meth)acrylates in $C_1$-$C_{10}$, notably the methyl (meth)acrylate, ethyl (meth)acrylate, n-butyl (meth)acrylate and isobutyl (meth)acrylate.

In a particularly preferred embodiment, the component (b) is or comprises monomer polycarboxylic acid. Monomer polycarboxylic acid is understood to mean a polycarboxylic acid which does not result from the polymerization of carboxylated monomers. A monomer carboxylic polyacid therefore does not include a chain of recurrent patterns.

It can be a dicarboxylic, tricarboxylic or tetracarboxylic acid.

The dicarboxylic acids include, for example, oxalic acid, malonic acid, succinic acid, glutaric acid, adipic acid, pimelic acid, suberic acid, azelaic acid, sebacic acid, malic acid, tartric acid, tartronic acid, aspartic acid, glutamic acid, fumaric acid, itaconic acid, maleic acid, traumatic acid, camphoric acid, phthalic acid and its derivatives, notably containing at least one atom of boron or of chlorine, tetrahydrophthalic acid and its derivatives, notably containing at least one atom of chlorine such as chlorendic acid, isophtalic acid, tetraphthalic acid, mesaconic acid and citraconic acid.

The tricarboxylic acids include, for example, citric acid, tricarballylic acid, 1,2,4-butanetricarboxylic acid, aconitic acid, hemimellitic acid, trimellitic acid and trimesic acid. 1,2,3,4-Butanetetracarboxylic acid and pyromellitic acid can for example be cited as tetracarboxylic acid.

Citric acid will preferably be used.

The component (b) advantageously represents from 30 to 70% by weight, preferably from 40 to 60% by weight, of dry materials of the gluing composition of the present invention. These values are understood to be before the addition of any additives.

The ratio by weight of the component (a) to the component (b) preferably lies between 70/30 and 30/70, in particular between 60/40 and 40/60.

The gluing composition can also comprise a catalyst which can be chosen for example from among the bases and the Lewis acids, such as the argiles, colloidal or non-colloidal silica, the metal oxides, the sulfates of urea, the urea chlorides and the catalysts based on silicates. An esterification catalyst is preferred.

The catalyst can also be a compound containing phosphorus, for example a hypophosphite of alkaline metal, a phosphite or alkaline metal, polyphosphate of alkaline metal, a hydrogenophosphate of alkaline metal, a phosphoric acid an alkylphosphonic acid.

Preferably, the alkaline metal is sodium or potassium.

The catalyst can also be a compound containing chlorine and/or boron for example tetrafluoroboric acid or a salt of this acid, notably a tetrafluoroborate of alkaline metal such as sodium or potassium, a tetrafluoroborate of alkaline-earth metal such as calcium or magnesium, a tetrafluoroborate of zinc and a tetrafluoroborate of ammonium.

Preferably, the catalyst is sodium hypophosphite, sodium phosphite or a mixture of these compounds.

The quantity of catalyst introduced into the gluing composition generally represents at most 20% by weight, advantageously from 1 to 10% by weight, and into the total weight of the components (a) and (b).

Generally, the embodiments which are described above are in no way limiting, it will notably be possible to devise variants of the invention comprising only a selection of features described that are consequently isolated by the other features mentioned in this document, if this selection of features is sufficient to confer a technical advantage or to differentiate the invention with respect to the state of the prior art.

The invention claimed is:

1. An annular discharge device for discharging a gluing composition onto mineral fibres, comprising at least one distribution circuit for distributing said gluing composition and a plurality of spray nozzles fluidically connected with the distribution circuit and distributed over a perimeter of the annular discharge device for discharging the gluing composition onto the fibres intended to pass inside the annular discharge device defined by an axis of revolution, each spray nozzle being oriented towards an interior of the annular discharge device with an angle of inclination determined in relation to a plane of revolution of the annular discharge device, wherein each spray nozzle of the plurality of spray nozzles is adjacent to spray nozzles whose orientation with respect to the plane of revolution of the annular discharge device is different from its own such that two consecutive spray nozzles of the plurality of spray nozzles arranged consecutively on the perimeter of the annular discharge device have a different angle of inclination with respect to one another.

2. The annular discharge device for discharging the gluing composition according to claim 1, wherein said angle of inclination with respect to the plane of revolution lies between 0 and 80°.

3. The annular discharge device for discharging the gluing composition according to claim 1, wherein each nozzle comprises a fixing body secured to an annular tube delimiting the at least one distribution circuit, said at least two spray nozzles consecutively arranged on the perimeter of the annular discharge device having bodies disposed at one and the same axial level in relation to the axis of revolution of the annular discharge device.

4. The annular discharge device for discharging the gluing composition according to claim 1, wherein the spray nozzles are divided up into at least two sets, between a first set in which each nozzle is configured so that the orientation with respect to the plane of revolution of the annular discharge device takes a first angle of inclination and a second set in which each nozzle is configured so that the orientation with respect to the plane of revolution of the annular discharge device takes a second angle of inclination that is distinct from the first angle, the spray nozzles being arranged on the perimeter of the annular discharge device with an alternation of nozzles of the first set and nozzles of the second set.

5. The annular discharge device for discharging the gluing composition according to claim 4, wherein the nozzles of said first set are configured so that they are oriented with respect to the plane of revolution of the annular discharge device with the first angle of inclination lying between 0° and 45° and wherein the nozzles of said second set are configured so that they are oriented with respect to the plane of revolution of the annular discharge device with the second angle of inclination lying between 25° and 80°.

6. The annular discharge device for discharging the gluing composition according to claim 1, wherein the at least two spray nozzles arranged consecutively on the perimeter of the annular discharge device comprise a spray head with a slit with a rectangular section so as to form a flat jet of gluing composition.

7. The annular discharge device for discharging the gluing composition according to claim 6, wherein the slit with the rectangular section is dimensioned in such a way that the corresponding flat jet of gluing composition has an angular aperture of between 30° and 120°.

8. The annular discharge device for discharging the gluing composition according to claim 1, wherein the distribution circuit for the gluing composition comprises a single feed and a plurality of orifices connected respectively with a spray nozzle.

9. The annular discharge device for discharging the gluing composition according to claim 1, wherein the at least one distribution circuit comprises two distinct distribution circuits that are offset along the axis of revolution of the annular discharge device, the spray nozzles being arranged between these two distribution circuits so as to be fluidically connected with each of said distribution circuits.

10. The annular discharge device for discharging the gluing composition according to claim 9, wherein a first distribution circuit of the two distinct distribution circuits is configured to receive said gluing composition and a second distribution circuit of the two distinct distribution circuits is configured to receive compressed air.

11. The annular discharge device for discharging the gluing composition according to claim 10, wherein the first distribution circuit has a mean section of diameter less than a diameter of a mean section of the second distribution circuit.

12. The annular discharge device for discharging the gluing composition according to claim 10, further comprising an air flow controller for controlling the compressed air flow rate as a function of the quantity of gluing composition to be discharged onto the fibres.

13. A mineral wool manufacturing installation, comprising fiberization means configured to bring glass fibres into a gluing station for these fibres, wherein the gluing station comprises only a gluing device formed by an annular discharge device for discharging the gluing composition according to claim 1, the annular device being arranged so as to have the plane of revolution substantially at right angles to a direction of passage of a torus of fibres to be glued.

14. The mineral wool manufacturing installation according to claim 13, wherein the at least one distribution circuit comprises two distinct distribution circuits that are offset along the axis of revolution of the annular discharge device, the spray nozzles being arranged between the two distribution circuits so as to be fluidically connected with each of said distribution circuits, wherein a first distribution circuit of the at least one distribution circuit is configured to receive said gluing composition and a second distribution circuit of the at least one distribution circuit is configured to receive compressed air, wherein the annular discharge device is arranged so that the first distribution circuit, associated with the gluing composition, is disposed downstream of the path of the fibres with respect to the second distribution circuit, associated with the compressed air.

\* \* \* \* \*